United States Patent [19]

Morley

[11] Patent Number: 5,169,107

[45] Date of Patent: Dec. 8, 1992

[54] MOUNTING DEVICES

[76] Inventor: George E. Morley, 14 Damude Drive, Fonthill, Ontario, Canada, L0S 1E0

[21] Appl. No.: 642,588

[22] Filed: Jan. 17, 1991

[51] Int. Cl.⁵ .............................................. A47B 97/00
[52] U.S. Cl. ................................................... 248/231
[58] Field of Search ............... 248/231; 24/279, 274 R

[56]  References Cited

U.S. PATENT DOCUMENTS 1,524,377  1/1925  Anderson .................... 248/231 X
4,350,063  9/1982  Koehler ...................... 24/279 X

FOREIGN PATENT DOCUMENTS 49371    4/1965  Poland ........................... 24/279
1038613  8/1966  United Kingdom ............. 24/274 R

*Primary Examiner*—Alvin C. Chin-Shue
*Attorney, Agent, or Firm*—Bereskin & Parr

[57]  ABSTRACT

A mounting device is provided for use in conjunction with a support rod. The device comprises a band of flexible material for extending around the support rod, one end portion of the band having a screw mounting for receiving the other end of the band and rotatably mounting a screw, the other end portion including a rack for engagement with the screw. An elongate attachment member extends from the screw and has a grip portion to permit hand rotation of the screw.

5 Claims, 4 Drawing Sheets

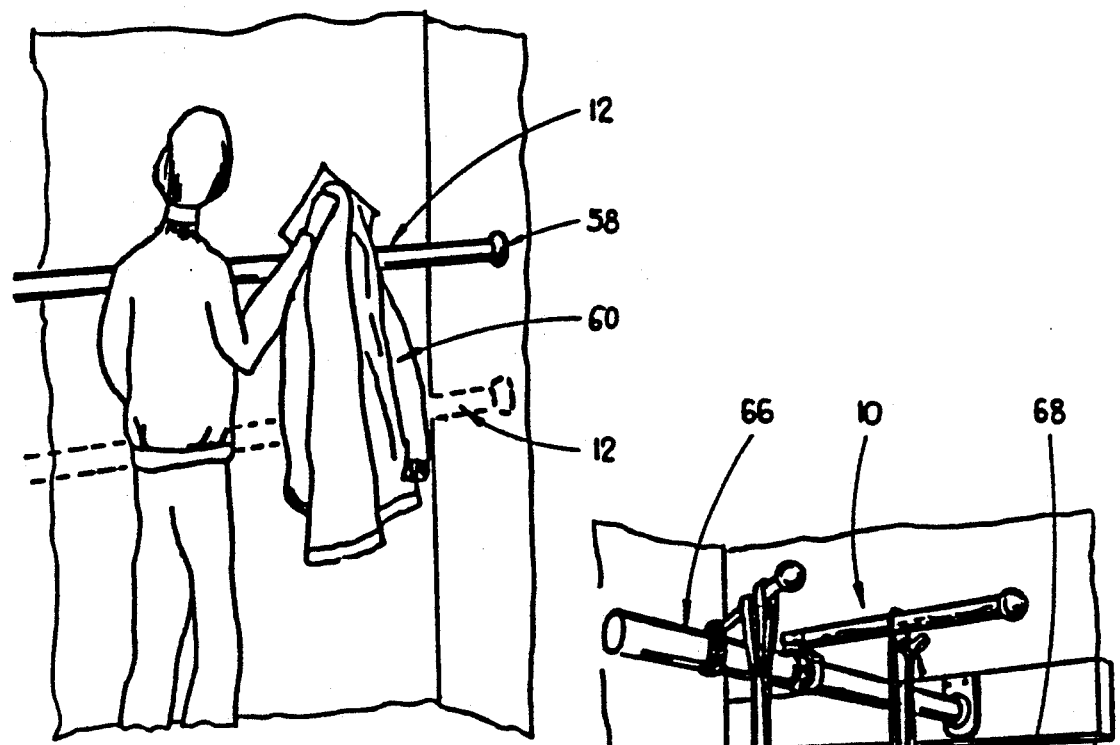
FIG. 4
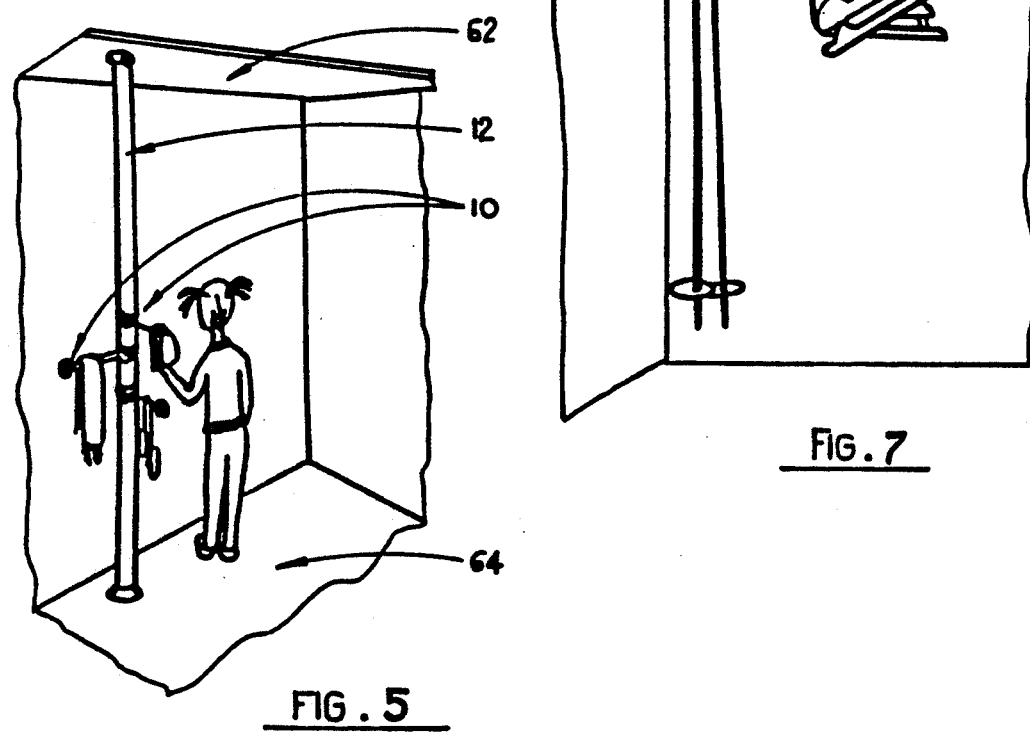
FIG. 5
FIG. 7

5,169,107

1

MOUNTING DEVICES

FIELD OF THE INVENTION

This invention relates to a mounting device, and in particular to a mounting device adapted for location on a circular rod or pole to provide, for example, a hanger for location in a storage closet for use in supporting coats, hats and other articles.

Circular section rods and poles are used in many applications as part of structures or displays, and for use as supports such as a coat rail.

Coat storage closets in homes are typically provided with fixed circular section rods or rails for supporting coat hangers. This is convenient for items of clothing such as shirts and jackets but is less convenient for items such as scarves or ties which must often be draped over part of a coat hanger. This arrangement does have disadvantages however, for example, a scarf will often slip to one end of a coat hanger such that the hanger does not hang level and be crushed at one end of the hanger, and the scarf may be difficult to locate in a crowded closet.

Hats require a separate hat rack, which will normally be too large to be stored in a closet, or may be placed on a shelf which is often provided above the support rod, where the hats and other articles may tend to be piled on top of one another and thus crush and damage the hats.

SUMMARY OF THE INVENTION

It is an object of this invention to provide a mounting device which may be easily fixed to a support rod to allow mounting of an object or article on the rod.

In one aspect of the present invention there is provided a mounting device comprising a band of flexible material for extending around a support rod. One end portion of the band has a screw mounting for receiving the other end of the band and rotatably mounting a screw. The other end portion includes a rack for engagement with the screw. An attachment member extends from the screw to provide a convenient mounting and has a grip portion extending radially outwardly of the member to permit hand rotation of the screw.

The device may be loosely mounted on a rod and the band tightened by rotating the screw using the grip portion, without the use of tools, to fix the device on the rod. The device may be mounted such that the attachment member extends at a convenient angle for supporting a particular item.

Preferably, the screw has a head portion which is located within the end of the attachment member. The head portion may include a through bore and a locking pin may be provided for extending through the bore and the adjacent portion of a attachment member to secure the member to the screw. Further, the member may be cemented to the head portion. Alternatively, the head portion may include a threaded portion for engaging a complementary threaded bore in the attachment member. A locking screw may be provided for passing through an aperture in the attachment member and engaging a recess in the threaded portion of the head portion.

In one preferred embodiment, there is provided a mounting device for attachment to a support rod to hang materials such as garments comprising a mounting member having a band of flexible material with a rack along its length for extending around the support rod, a screw mounting proximate to one end portion of the band for receiving the other end portion of the band, the screw mounting rotatably mounting a screw which releasably engages the rack, and a separate attachment member extending outwardly from the screw of the mounting member to provide a peg for hanging garments, wherein the attachment member engages the screw to permit rotation of the screw by rotation of the attachment member. The grip portion is rounded and is fixed to the end of the attachment member, which provides a garment hanging peg. The grip portion thus provides a comfortable grip to allow tightening and loosening of the band and also provides a convenient hanger for hats and the like.

In a further preferred embodiment, the device may be used to provide a mounting for display signs. The attachment member may simply be of plain elongate form to provide a pole or rod to be received in a sleeve at one end of a banner-type sign. Alternatively, the attachment member may have a flat end portion provided with a threaded bore for receiving a screw which may be used to clamp a rigid sign frame to the end of the attachment member.

In a further aspect of the present invention there is provided a mounting device in conjunction with a support rod for supporting the mounting device. The support rod may include end portions for fixing to support surfaces and may be extendable and capable of locking in an extended configuration, having resilient end portions to permit the rod to be mounted between two opposing support surfaces, or may include a base for supporting the rod on a surface in an upright orientation. The extendable configuration of support rod allows the height of the support rod to be varied, for example in a storage closet, to suit the use of the garment hanger and support rod or to match the stature of the user. Also, this arrangement does not require the provision of mounting screws or screw holes in the supporting surfaces.

BRIEF DESCRIPTION OF THE DRAWINGS

These and other aspects of the present invention will now be described, by way of example, with reference to the accompanying drawings, in which:

FIGS. 4, 5 and 6 are perspective views illustrating different applications of the mounting device of FIG. 1;

FIG. 7 is a perspective view of two mounting devices and a support rod in accordance with a further preferred embodiment of the present invention (on same sheet as FIGS. 4 and 5);

DETAILED DESCRIPTION OF DRAWINGS

Figure 1:
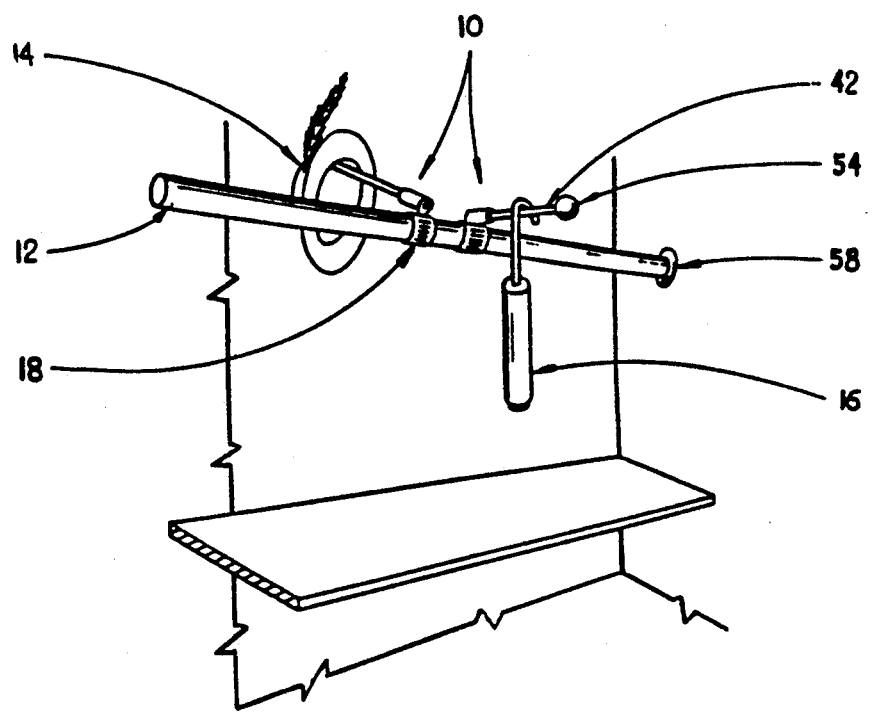
FIG. 1 is a perspective view of a mounting device and support rod according to a preferred embodiment of the present invention, shown in use as a garment hanger and located in a closet and supporting a hat and an umbrella.

Reference is first made to FIG. 1 of the drawings which illustrates two mounting devices in the form of garment hangers 10 mounted on a support rod 12. The garment hangers 10 are shown supporting, respectively, a hat 14 and an umbrella 16.

Figures 2, 3:
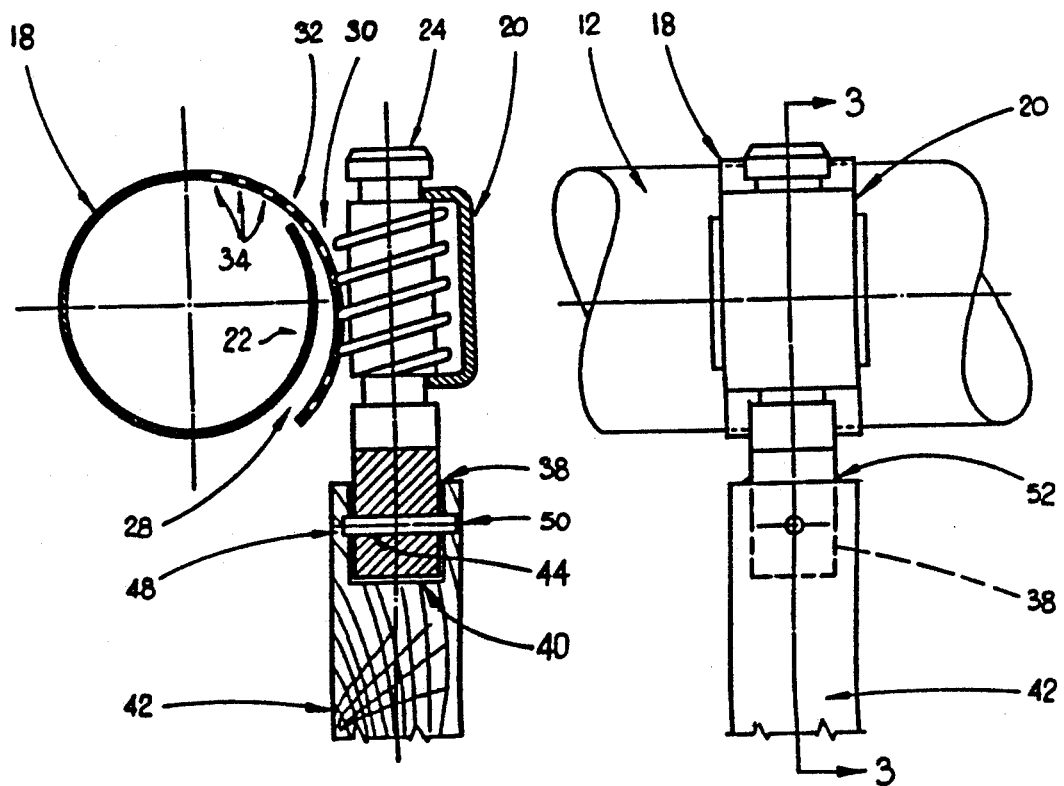
FIG. 2 is a plan view of a portion of the mounting device and rod of FIG. 1, shown enlarged.
FIG. 3 is a sectional view on line 3—3 of FIG. 2.

Reference is now made also to FIGS. 2 and 3 of the drawings which illustrate aspects of a hanger 10 in greater detail. Each hanger 10 comprises a band of flexible material 18 for extending around the support rod 12. A screw mounting 20 is fixed to one end portion 22 of the band and provides a rotatable mounting for a screw 24 and a path 28 for receiving the other end portion 30 of the band. The end portion 30 is provided with a rack 32, formed by a series of apertures 34 in the band 18, for engagement with the screw 24, such that rotation of the screw 24 reduces or increases the effective length of the band 18 and thus tightens or loosens the band on the support rod 12. When the band 18 is loosened the hanger may be moved on the rod, or may be removed from the rod.

The screw has a head 38 which extends from the mounting 20 and is received in a complementary bore 40 provided in the end of an elongate attachment or hanger member 42, which forms a garment hanging peg. To lock the member 42 to the screw head 38, a throughbore 44 is provided in the screw head for receiving a locking pin 48 which also extends through a bore 50 provided in the end portion of the hanger member 42. Additionally, epoxy or other suitable adhesive 52 may be provided between the screw head 38 and the bore 40.

The other end of the hanger member is provided with an enlarged end 54 to provide a grip portion of larger diameter than the member 42 and may be used as a grip by an operator to rotate the screw 24 and thus tighten or loosen the band 18. The end 54 also provides a convenient mounting for hats and the like and assists in retaining other items on the hanger member 42.

In the illustrated embodiment the hanger 10 is formed of a conventional metal hose clamp and the hanger member is formed of a hardwood dowel. The finish for the hanger 10 may be selected as appropriate, the band 18, 19 and 20 being provided, for example, in unfinished stainless steel or primed or painted and the hanger member 42 being provided with a natural wood finish, or primed or painted. Clearly, other materials, such as an appropriate metal or plastic, could be used to form the hanger.

The rod 12 as illustrated in FIG. 1 is extendable, and comprises two sections, (only one shown), one of which is telescopically received within the other. The two sections may be locked relative to one another by a number of means, one of the most common being an internal mechanism which is locked by rotation of one of the sections in a particular direction relative to the other. For abutting a supporting surface the ends of the rod are provided with resilient end caps 58 (FIG. 1).

Providing a garment hanger 10 and rod 12 of this form allows considerable flexibility in the positioning and mounting of garment hangers, as illustrated in FIG. 4 of the drawings, where the lower chain dotted rod outline 12' indicates an alternative location for the rod. For a child's storage closet the support rod 12 could be initially located in the lower position, and moved upwardly as the child grows to accommodate larger items of clothing and for the convenience of the child. FIG. 4 illustrates a coat 60 being hung on a hanger. It is also possible that coats, jackets and the like could be placed on conventional coat hangers and suspended from the support rod 12 while the hangers 10 provide an alternative for hanging jackets and the like and also provide for mounting of hats and the like. The hanger members 42 may be oriented such that they extend upwardly from the rod 12 and clear of any clothing that is hanging from conventional coat hangers. Alternatively, a separate support rod may be provided in an upper portion of a closet above the normal fixed rod to provide separate storage for hats, umbrellas, scarves and the like.

FIG. 5 of the drawings illustrates a further application of garment hangers 10 and the support rod 12, the support rod 12 being shown oriented vertically between the ceiling 62 and floor 64 of a room, with garment hangers 10 extending horizontally from the rod 12.

Figure 6:
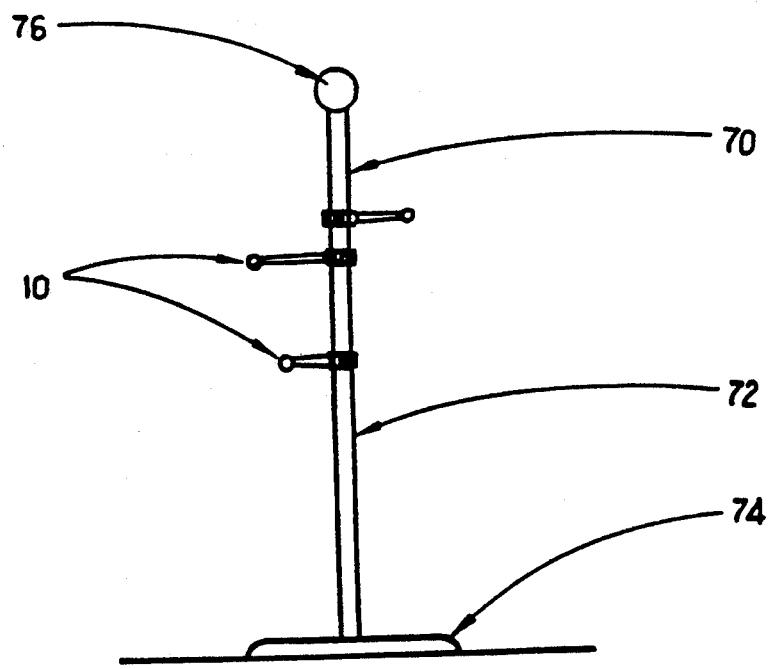

FIG. 6 of the drawings illustrates garment hangers 10 mounted on a stand 70 formed of an upright pole 72 provided with a weighted base 74, provided with a protective covering. The upper end of the pole 72 is topped with an end cap which, in the illustrated example, is a larger diameter ball 76 which may be removable to allow hangers 10 to be removed from the pole 72. Of course, the hangers 10 may be positioned at any convenient height on the pole 72.

The hangers 10 need not necessarily be provided with hanger members as described above but may also be provided with hooks or pegs as desired. The pole 72 may be of any suitable material, such as wood, plastic or metal and finished as desired.

FIG. 7 of the drawings illustrates a further embodiment of the present invention in which the support rod 66 is fixed to a support surface. This form of rod 66 is more appropriate for mounting heavier items, such as winter coats or skates 68.

Figure 8:
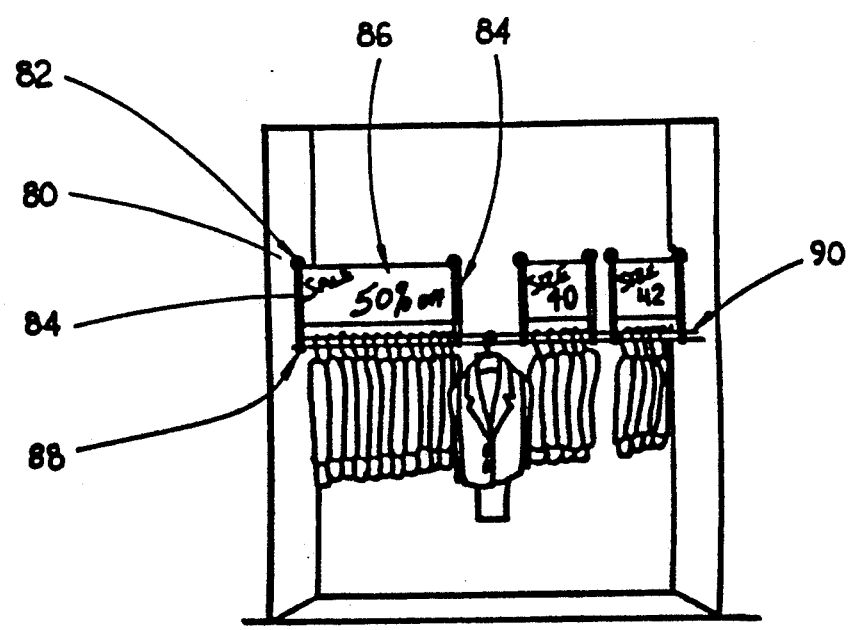
FIG. 8 is a view illustrating still further applications of the mounting device of FIG. 1, with the mounting device being used to support banner-type signs.

FIG. 8 of the drawings illustrates a somewhat different application for a mounting device 80 in accordance with a preferred embodiment of the present invention, for use in store displays and the like. The device is substantially similar to the garment hanger 10 described above but is provided with a relative smaller enlarged end 82. This is to permit a sleeve 84 formed at the end of a banner-type sign 86 to be slipped over the end and positioned over the attachment member 88. The Figure illustrates signs 86 having sleeves 84 at both ends such that the signs may extend and be tensioned between two mounting devices 80. As the mounting devices may be readily loosened on the hanger rod 90, signs of different lengths may be easily accommodated. In other applications, inclined or horizontally arranged devices 80 may be used to support banner-type signs having a sleeve at only one end.

Figure 9:
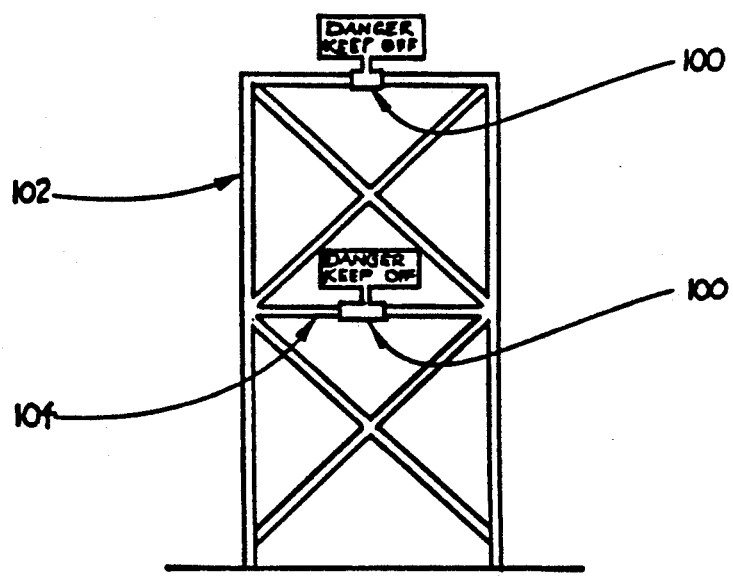
FIG. 9 is a view illustrating a mounting device according to a further preferred embodiment of the present invention, with the mounting device being used to support a rigid sign.
Figures 10, 11:
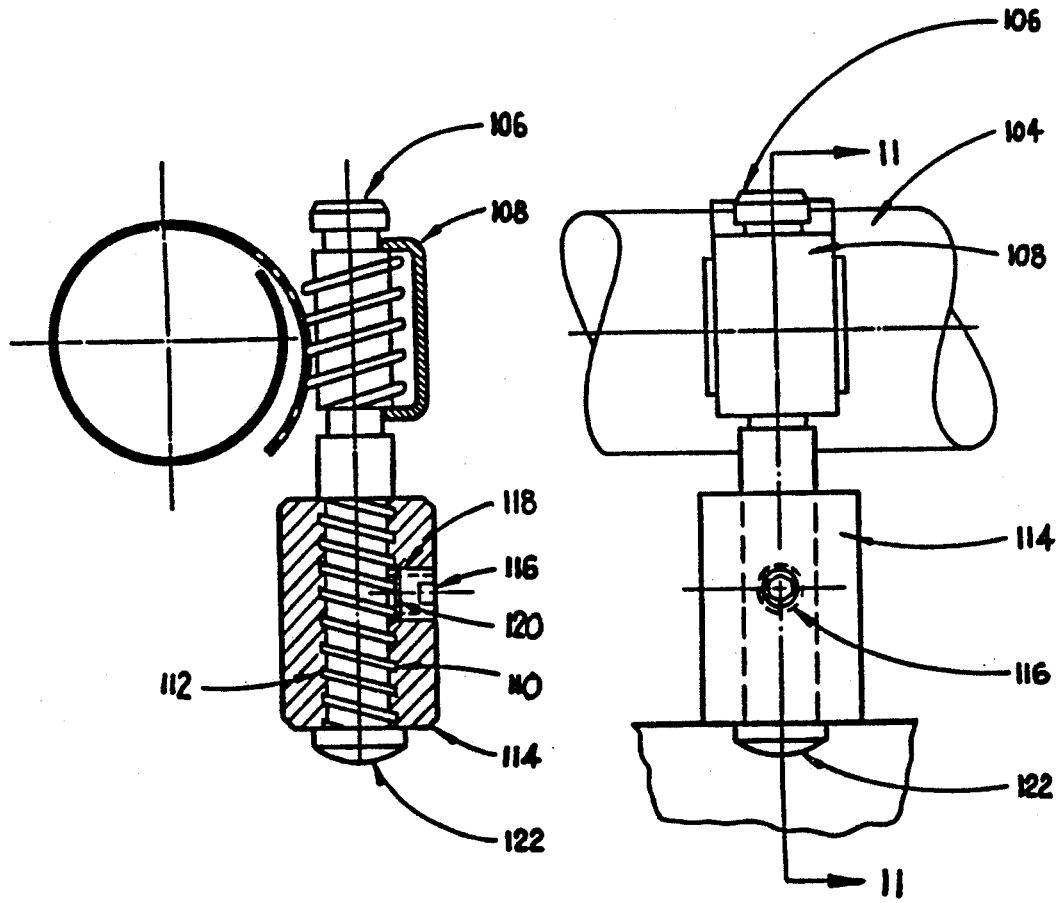
FIG. 10 is a plan view of a portion of the mounting device and sign of FIG. 9.
FIG. 11 is a sectional view on line 11—11 of FIG. 10.

Reference is now made to FIGS. 9, 10 and 11 of the drawings which illustrate a further preferred embodiment of the present invention, in which a mounting device 100 is used for mounting a sign having a rigid frame. FIG. 9 illustrates a scaffolding frame 102 on which two warning signs have been mounted using mounting devices 100.

FIG. 10 illustrates the details of one of the devices, which is mounted on a circular section cross member 104. The device 100 is substantially similar to the device 10 described above, but is provided with a screw and attachment member of somewhat different configuration. The screw 106 is mounted in a screw mounting 108 and is provided with an elongate threaded head 110 which engages a complementary threaded bore 112 in an attachment member 114. A circular collar section is provided between the head 110 and the band engaging threaded portion of the screw. The attachment member is in the form of a square section block and may be locked relative to the head 110 by a setting or locking screw 116 which is located in an aperture 118 in the member 114 and which engages the head 110. The bore is provided with a part annular slot 120 to receive the end of the locking screw 116 to provide a degree of rotation of the attachment member 114 relative through to the head 110 without the locking screw 116 being completely loosened.

The opposite end of the attachment member 114 is flat and the threaded bore 112 extends to the end of the member for receiving a screw fastener 122. This allows the rigid frame of the sign to be clamped to the member 114 by the screw 112 as can be seen in FIG. 10. The attachment member 114 is preferably formed of a suitable metal and may be square in section, as described above or some other shape such as round or hexagonal.

In other embodiments the attachment member 114 may be of greater length to allow mounting of a sign and the like somewhat further spaced from the mounting cross member. In this event, it is not necessary that the thread extends over the length of the bore in the member and need only be provided at the ends of the bore.

Thus, it will be clear that the mounting devices and rods described above provide a convenient means for mounting various items, and which are readily adjustable and adaptable for various applications.

It will be clear to those skilled in the art that the embodiments described above are merely exemplary of the present invention, and that modifications and improvements may be made without departing from the scope of the invention.

I claim:

1. A mounting device comprising a band of flexible material for extending around a support rod, one end portion of the band having a screw mounting for receiving the other end of the band and rotatably mounting a screw, the other end portion including a rack for engagement with the screw, and an attachment member extending from the screw to provide a mounting and having a grip portion extending radially outwardly to permit hand rotation of the screw, wherein the attachment member includes a clamp for clamping an object to the member.

2. The mounting device of claim 1, wherein the clamp is formed by a screw which engages a complementary threaded bore in the end of the attachment member.

3. An assembly for mounting a sign to a support rod comprising a band of flexible material for extending around the support rod, one end portion of the band having a screw mounting for receiving the other end of the band and rotatably mounting a screw, the other end portion of the band including a rack for engagement with said screw wherein said screw is provided with an elongate threaded head which is adapted to engage a complimentary threaded bore in an attachment member extending from said screw and said attachment member includes means for mounting a sign thereto.

4. A mounting device for attachment to a support rod to hang materials such as garments, said mounting device comprising:
 (a) a mounting member having a band of flexible material for extending around said support rod, said band having a rack along its length, a screw mounting proximate to one end portion of said band for receiving the other end portion of said band, said screw mounting rotatably mounting a screw, said screw releasably engaging said rack, and
 (b) a separate attachment member extending outwardly from said screw to provide a peg for hanging said materials,
wherein said attachment member engages said screw to permit rotation of said screw by rotation of said attachment member, and wherein a locking screw is provided to lock said attachment member to the head of said screw, said screw being located in a threaded aperture in said attachment member.

5. The mounting device of claim 4 wherein said attachment member is enlarged at its free end.

* * * * *